(12) United States Patent
Rocca et al.

(10) Patent No.: US 7,729,403 B2
(45) Date of Patent: Jun. 1, 2010

(54) HIGH-ORDER HARMONIC GENERATION IN A CAPILLARY DISCHARGE

(75) Inventors: Jorge J. Rocca, Fort Collins, CO (US); Henry C. Kapteyn, Boulder, CO (US); Margaret M. Mumane, Boulder, CO (US); David Gaudiosi, Orlando, FL (US); Michael E. Grisham, Fort Collins, CO (US); Tenio V. Popmintchev, Boulder, CO (US); Brendan A. Reagan, Fort Collins, CO (US)

(73) Assignees: Colorado State University Research Foundation, Fort Collins, CO (US); Regents of the University of Colorado, a body corporate, Denver, CO (US)

( * ) Notice: Subject to any disclaimer, the term of this patent is extended or adjusted under 35 U.S.C. 154(b) by 174 days.

(21) Appl. No.: 11/804,888

(22) Filed: May 21, 2007

(65) Prior Publication Data

US 2008/0069171 A1  Mar. 20, 2008

Related U.S. Application Data

(60) Provisional application No. 60/801,914, filed on May 19, 2006.

(51) Int. Cl.
*H01S 3/03* (2006.01)
(52) U.S. Cl. ......................... 372/61; 250/504
(58) Field of Classification Search ............. 250/492.2, 250/504; 372/61
See application file for complete search history.

(56) References Cited

U.S. PATENT DOCUMENTS 6,018,537 A * 1/2000 Hofmann et al. ............ 372/25
6,151,155 A 11/2000 Durfee, III et al.
2004/0135103 A1 * 7/2004 Wester .................... 250/504 R

OTHER PUBLICATIONS

Shkolnikov, P. L. et al, Optimal Quasi-Phase-Matching for High-Order Harmonic Generation in Gases and Plasma, Phys Review A, Dec. 1994, pp. R4461-R4464, vol. 50, No. 6.

Milchberg, H. M. et al, High-Order Frequency Conversion in the Plasma Waveguide, Physical Review Letters, Sep. 1995, pp. 2494-2497, vol. 75, No. 13.

Rundquist, A. et al, Phase-Matched Generation of Coherent Soft X-Rays, Science, May 1998, pp. 1412-1415, vol. 280.

Durfee III, C. G. et al, Phase Matching of High-Order Harmonics in Hollow Waveguides, Physical Review Letters, Sep. 1999, pp. 2187-2190, vol. 83, No. 11.

(Continued)

*Primary Examiner*—Minsun Harvey
*Assistant Examiner*—Tuan N. Nguyen
(74) *Attorney, Agent, or Firm*—Jennifer L. Bales; Macheledt Bales LLP

(57) ABSTRACT

A pre-ionized medium created by a capillary discharge results in more efficient use of laser energy in high-order harmonic generation (HHG) from ions. It extends the cutoff photon energy, and reduces the distortion of the laser pulse as it propagates down the waveguide. The observed enhancements result from a combination of reduced ionization energy loss and reduced ionization-induced defocusing of the driving laser as well as waveguiding of the driving laser pulse. The discharge plasma also provides a means to spectrally tune the harmonics by tailoring the initial level of ionization of the medium.

16 Claims, 7 Drawing Sheets

OTHER PUBLICATIONS

Gibson, E. A. et al, High-Order Harmonic Generation up to 250 eV from Highly Ionized Argon, Physical Review Letters, Jan. 2004, p. 033001-1 to 033001-4, vol. 92, No. 3.

Gibson, E. A. et al, Coherent Soft X-Ray Generation in the Water Window with Quasi-Phase Matching, Science, Oct. 2003, pp. 95-98, vol. 302.

Lange, H. R., et al, High-Order Harmonic Generation and Quasiphase Matching in Xenon Using Self-Guided Femtosecond Pulses, Physical Review Letters, Aug. 1998, pp. 1611-1613, vol. 81, No. 8.

Spence, D. J. et al, First Demonstration of Guiding of High-Intensity Laser Pulses in a Hydrogen-Filled Capillary Discharge Waveguide, Journal of Physics B, Oct. 2001, pp. 4103-4112, vol. 34.

Butler, A. et al, Guiding of High-Intensity Laser Pulses with a Hydrogen-Filled Capillary Discharge Waveguide, Physical Review Letters, Oct. 2002, pp. 185003-1 to 185003-4, vol. 89, No. 18.

Luther, B. M. et al, Guiding of Intense Laser Beams in Highly Ionized Plasma Columns Generated by a Fast Capillary Discharge, Physical Review Letters, Jun. 2004, pp. 235002-1 to 235002-4, vol. 92, No. 23.

Wang, Y., et al, Capillary Discharge-Driven Metal Vapor Plasma Waveguides, Physical Review E, Aug. 2005, pp. 026413-1 to 026413-6, vol. 72.

Spence, D. J. et al, Gas-Filled Capillary Discharge Waveguides, Journal of Optical Society of America B, Jan. 2003, pp. 138-151, vol. 20, No. 1.

Walstrom, C. G. et al, High-Order Harmonic Generation in Rare Gases with an Intense Short-Pulse Laser, Physical Review A, Dec. 1993, pp. 4709-4720, vol. 48, No. 6.

* cited by examiner

HIGH-ORDER HARMONIC GENERATION IN A CAPILLARY DISCHARGE

PRIORITY

This application claims the benefit of Provisional Application for Patent No. 60/801,914 filed May 19, 2006.

GOVERNMENT SUPPORT

DOE DE-FG02-04ER15592 A001 through the Department of Energy Office of Basic Energy Sciences, "High Harmonic Generation in Discharge-Ionized Plasma Channels." Grant awarded to Colorado State University, with subcontract to University of Colorado.

National Science Foundation Cooperative Agreement No. EEC-0310717, NSF Engineering Research Center in Extreme Ultraviolet Science and Technology. Grant awarded to Colorado State University, with subcontract to University of Colorado.

BACKGROUND OF THE INVENTION

1. Field of the Invention

This invention relates to apparatus and methods for high-order harmonic generation (HHG) from ions in a capillary discharge plasma. In particular, the present invention relates to HHG in a capillary discharge wherein an electric discharge is used to pre-ionize the medium for the driving laser.

2. Description of Related Art

High-order harmonic generation (HHG) has proven to be a useful source of coherent extreme ultraviolet (EUV) and soft x-ray radiation. Several applications of HHG light have been demonstrated to date, such as the investigation of surface dynamics [1, 2], probing static molecular structure and internal molecular dynamics [3, 4], the study of nonlinear optic effects at EUV wavelengths [5], as well as holographic [6] and photo-acoustic [7] imaging. When a medium is illuminated by an intense laser field, odd-order harmonics of the fundamental laser are generated. The highest photon energy that can be produced through this process is predicted by the cutoff rule to be hvmax=Ip+3.17 Up, where Ip is the ionization potential of the target atom and Up is the ponderomotive energy of the liberated electron in the laser field [8]. (Up=E2/4ω2 in atomic units where E is the peak of the laser electric field with frequency ω). In principle with long wavelength or high field lasers, hvmax may be as high as 10 keV or greater before relativistic effects suppress re-scattering and HHG [9].

To date however, for many experiments the highest harmonic photon energies observed have not been limited by the available laser intensity, but rather by the ionization of the nonlinear medium by the driving laser. The depletion of neutrals does not terminate the harmonic emission since high harmonics may also be generated from ions. Rather, the electron density from photo-ionization refractively defocuses the driving laser, reducing the peak laser intensity and consequently the highest harmonic photon energy observed. Moreover, the resulting plasma imparts different phase velocities to the driving laser and the HHG light, which results in poor phase-matching and conversion efficiency. Finally, the loss of the laser energy due to photo-ionization limits the length in the medium over which a high peak intensity can be maintained.

In past experiments, extremely short laser pulses, [10] and target atoms with high ionization potential [11] were employed to obtain the highest possible photon energies, since both of these characteristics allows neutral atoms to survive to higher laser intensities. Seres et al. recently demonstrated that harmonics with photon energies up to >1 keV can be obtained by using intense 12 fs laser pulses focused into a He gas cell [12]. Although nonadiabatic effects may help to ameliorate the very short coherence length in these experiments, [13] the high harmonic flux produced is nevertheless very low. Another method to extend harmonics to higher photon energies is to generate harmonics from ions rather than neutral atoms [14, 15]. Ions have higher ionization potentials than neutrals and therefore ionize at much higher laser intensities. Gibson et al. demonstrated that significantly higher harmonics, up to 250 eV, can be generated from Ar ions by confining the driving laser beam in a gas-filled hollow waveguide. The use of a hollow waveguide greatly reduces ionization-induced defocusing, allowing a significant extension of the cutoff photon energy.

Harmonic generation in a preformed plasma with a tailored density profile can further enhance harmonic generation from ions. The use of preformed plasma waveguides for HHG has been previously proposed [16, 17], but was not demonstrated experimentally until recently. Capillary discharges provide a convenient way to generate plasma waveguides with a tailored degree of ionization in numerous gases and vapors [17-20], in which the generation of high harmonics from ions can extend efficient coherent light generation to shorter wavelengths. In recent work, we demonstrated that a significant extension of the HHG cutoff in Xe can be obtained using a capillary discharge to produce a preformed, fully-ionized plasma [21]. In that work, the range of photon energies generated in Xe was extended to ~150 eV, well above the highest previously-observed value of ~70 eV [22].

Subsequent experiments expanded on these findings by extending high harmonic generation from Xe, Kr, and Ar using a capillary discharge, to photon energies well beyond what have been previously observed. Harmonic emission from Kr and Ar in a discharge medium was demonstrated. Our results show that in all three gases, the cutoff energy for HHG is enhanced in a capillary discharge beyond what is possible in a capillary without the discharge.

By combining experimental measurements of the harmonic spectrum and of the transmitted laser pulse with a hydrodynamic model of the discharge plasma, we showed HHG emission from ions is extended and enhanced because of improved laser transmission through the waveguide. When high harmonics are to be generated from interaction of the intense laser with ions, rather than with neutral atoms, pre-ionizing the medium results in reduced ionization-induced defocusing, decreased ionization losses, and reduced self-phase modulations and other pulse distortions that can limit the efficiency of high harmonic generation. Moreover, the ionized medium created by the discharge also provides a method to spectrally tune the harmonics by tailoring the initial level of ionization of the medium.

A need remains in the art for apparatus and methods for efficient high-order harmonic generation from ions in a capillary discharge wherein an electric discharge is used to pre-ionize the medium for the driving laser, generating coherent light at shorter wavelengths.

REFERENCES

[1] M. Bauer, J. Phys. D 38, R253 (2005).
[2] L. Miaja-Avila, C. Lei, M. Aeschlimann, J. L. Gland, M. M. Murnane, H. C. Kapteyn, and G. Saathoff, Phys. Rev. Lett. 97, 113604 (2006).

[3] J. Itatani, J. Levesque, D. Zeidler, H. Niikura, H. Pépin, J. C. Kieffer, P. B. Corkum, and D. M. Villeneuve, Nature 432, 867 (2004).
[4] N. L. Wagner, A. Wüest, I. P. Christov, T. Popmintchev, X. Zhou, M. M. Murnane, and H. C. Kapteyn, PNAS 103, 13279 (2006).
[5] H. Hasegawa, E. Takahashi, J., Y. Nabekawa, K. L. Ishikawa, and K. Midorikawa, Physical Review A 71, 023407 (2005).
[6] R. A. Bartels, A. Paul, H. Green, H. C. Kapteyn, M. M. Murnane, S. Backus, I. P. Christov, Y. Liu, D. Atwood, and C. Jacobsen, Science 297, 379 (2002).
[7] R. a. I. Tobey, M. E. Siemens, O. Cohen, M. M. Murnane, and H. C. Kapteyn, Optics Letters, to be published (2007).
[8] K. C. Kulander, K. J. Schafer, and J. L. Krause, in Super-Intense Laser-Atom Physics, edited by B. Piraux, A. L'Huillier, and K. Rzazewski (Plenum, New York, 1993), p. 95.
[9] S. Palaniyappan, I. Ghebregziabher, A. DiChiara, J. MacDonald, and B. C. Walker, (APS, 2006), p. 033403.
[10] J. Zhou, J. Peatross, M. M. Murnane, H. C. Kapteyn, and I. P. Christov, Physical Review Letters 76, 752 (1996).
[11] Z. H. Chang, A. Rundquist, H. W. Wang, M. M. Murnane, and H. C. Kapteyn, Physical Review Letters 79, 2967 (1997).
[12] E. Seres, J. Seres, and C. Spielmann, Applied Physics Letters 89, 181919 (2006).
[13] T. Brabec, and F. Krausz, Reviews of Modern Physics 72, 545 (2000).
[14] E. A. Gibson, A. Paul, N. Wagner, R. a. Tobey, S. Backus, I. P. Christov, M. M. Murnane, and H. C. Kapteyn, Physical Review Letters 92, 033001 (2004).
[15] J. L. Krause, K. J. Schafer, and K. C. Kulander, Physical Review Letters 68, 3535 (1992).
[16] H. M. Milchberg, C. G. Durfee III, and T. J. McIlrath, Physical Review Letters 75, 2494 (1995).
[17] A. Butler, D. J. Spence, and S. M. Hooker, Physical Review Letters 89, 185003 (2002).
[18] B. M. Luther, Y. Wang, M. C. Marconi, J. L. A. Chilla, M. A. Larotonda, and J. J. Rocca, Physical Review Letters 92, 235002 (2004).
[19] Y. Wang, B. M. Luther, M. Berrill, M. Marconi, F. Brizuela, J. J. Rocca, and V. N. Shlyaptsev, Physical Review E 72, 026413 (2005).
[20] D. J. Spence, A. Butler, and S. M. Hooker, J. Opt. Soc. Am. B 20, 138 (2003).
[21] D. M. Gaudiosi, B. A. Reagan, T. Popmintchev, M. Grisham, M. Berrill, O. Cohen, B. C. Walker, M. M. Murnane, H. C. Kapteyn, and J. J. Rocca, Physical Review Letters 96, 203001 (2006).
[22] C. G. Wahlström, J. Larsson, A. Persson, T. Starczewski, S. Svanberg, P. Salières, P. Balcou, and A. L'Huillier, Physical Review A 48, 4709 (1993).

SUMMARY

An object of the present invention is to provide apparatus and methods for efficient high-order harmonic generation (HHG) from ions in a capillary discharge plasma wherein an electric discharge is used to pre-ionize the medium for the driving laser. HHG is defined to include high order frequencies generated from mixed light colors (sum, difference, and parametric generation) as well as single color HHG.

Apparatus for generation of coherent light by high-order harmonic generation (HHG) might include apparatus for providing coherent periodic optical pulses and electric discharge apparatus for generating pre-ionized plasma, including apparatus for supplying a gas at a predetermined pressure and circuitry to provide a periodic electric discharge across the gas for ionizing the atoms of the gas. The periodic discharge leads the optical pulses by an interval, τ. Optics direct the optical pulses into the ionized gas. Thus the electric discharge apparatus pre-ionizes the gas and the optical pulses cause HHG in the pre-ionized gas.

In a preferred embodiment, the electric discharge apparatus is a capillary discharge, the apparatus for supplying the gas inserts the gas into the capillary, and the circuitry discharges across the length of the capillary. Generally the gas is a noble gas, for example Ar, Xe, or Kr.

Various parameters may be adjusted to optimize an aspect of the HHG pulses, such as discharge current, Delay time τ, or Composition, or pressure of the gas. For example, the gas pressure may be sufficiently high that without pre-ionization, the pulses would be defocused and distorted via phase modulation, but with pre-ionization the defocusing and distortion is substantially reduced. The discharge current may selected to result in an index of refraction profile in the gas which guides the laser pulses. The discharge current May be selected to result in a desired tuning of the harmonic wavelength of the HHG pulses. Or, the discharge current is selected to achieve a desired amount of pre-ionized gas atoms.

In preferred embodiments, the discharge current is on the order of 5-50 A, τ is on the order of 1-10 µs, and the apparatus for providing coherent periodic optical pulses is a femtosecond laser.

DETAILED DESCRIPTION OF THE PREFERRED EMBODIMENTS

The reference numbers below and their associated elements are used in the figures and specification:

| Reference number | Element |
|---|---|
| 100 | HHG apparatus |
| 102 | Ultrafast laser |
| 104 | Laser pulses |
| 106 | Focus element for laser pulses |
| 107 | Focused laser pulses |
| 108 | Entrance to capillary discharge and Anode |
| 110 | Capillary discharge |
| 112 | Exit from capillary discharge |
| 113 | Visible and HHG output from capillary discharge |
| 114 | Removable mirror |
| 115 | Transmission to spectrometer |
| 116 | X-Ray spectrometer |
| 117 | Transmission to optimizing apparatus |
| 118 | Thin film filters |
| 119 | Filtered HHG |
| 120 | X-Ray CCD |
| 122 | Visible CCD |
| 126 | Beam splitter |
| 136 | Energy meter |
| 140 | Gas |
| 142 | Gas inlet 1 |
| 143 | Gas inlet 2 |
| 144 | Capillary |
| 152 | Vacuum |
| 154 | Anode |

Figure 1A:
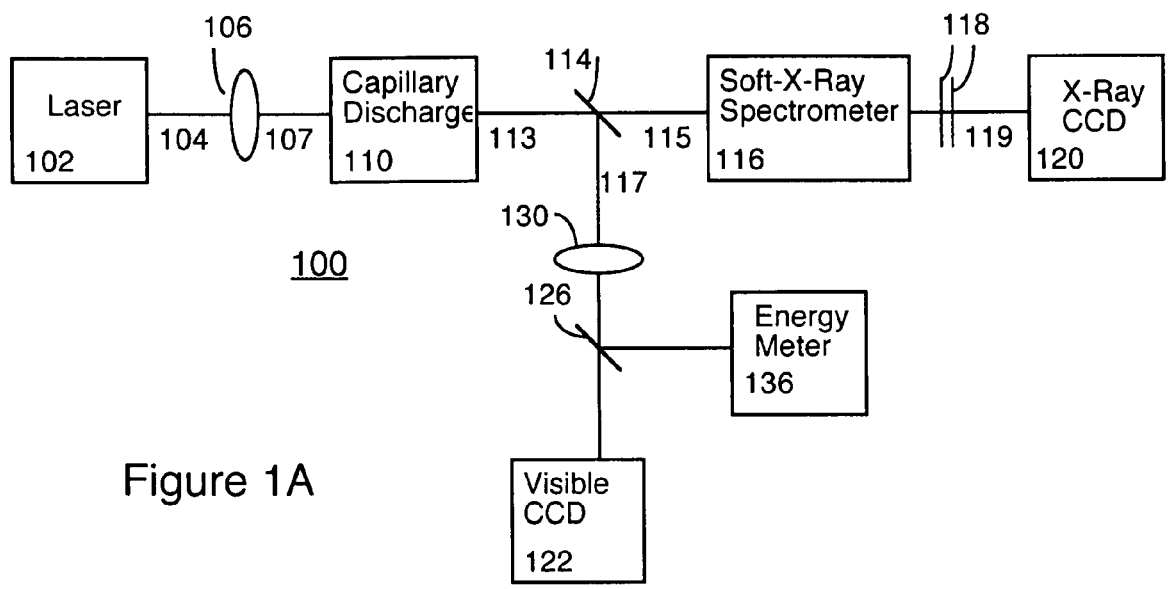
FIG. 1A is a block diagram illustrating an example of high-order harmonic generation (HHG) from ions in a capillary discharge plasma according to the present invention.

FIG. 1A is a block diagram illustrating an example of apparatus 100 for high harmonic generation in a capillary discharge 110, in combination with diagnostics equipment. Capillary discharge 110 is shown in more detail in FIG. 1B. The key to the present invention is that capillary discharge 110 uses an electric discharge to pre-ionize the HHG medium, so that laser 102 does not need to ionize the medium. This results in more efficient use of the laser energy. It extends the cutoff photon energy in high-order harmonic generation (HHG). In addition, pre-ionization dramatically reduces distortion of the pulse as it propagates down the waveguide.

The embodiment of FIG. 1A combines the high harmonic capillary generation setup with a lower branch used to optimize the operation of capillary discharge 110 and a branch to the right for providing the HHG transmission in a useful form for various applications. Removable mirror 114, when in place, directs the combined optical and HHG radiation 117 from capillary discharge 110 down through focus element 130 to beam splitter 126. Focus element 130 produces a magnified image of the optical laser beam exiting the capillary discharge 110 on visible CCD 122.

Part of the radiation is directed to energy meter 136, which measures how much of the energy of input beam 107 is being transmitted through capillary discharge 110. The rest of radiation 117 is directed to a visible CCD 122, which is used to analyze the beam quality. Adjustments are made (as described below) to improve these aspects of the operation of capillary discharge 110.

When removable mirror 114 is removed, the combined optical and HHG radiation 115 from capillary discharge 110 is transmitted to soft X-Ray spectrometer 116, which fans out the spectrum it receives, such that the spectrum is spatially laid out. This spread spectrum may be used in a variety of manners. Or, an application such as absorption spectroscopy might be inserted prior to spreading the spectrum.

Thin film filters 118 remove the visible radiation from the beam to create a purely HHG beam 119 which is measured by X-Ray CCD 120 in this embodiment. Thin films 118 may be placed earlier in the apparatus if desired, for example before spectrometer 116.

In one experiment device similar to that shown in FIG. 1, the experimental setup consisted of a mode locked, ultrafast, femtosecond laser system to generate the necessary high intensities and an adjustable capillary discharge to create the interaction region. Lasers with frequencies from 5 fs to 200 ps maybe useful in various applications, but in the preferred embodiments, the laser is around 25 fs.

Gas was injected into a 250 µm inner diameter, 50 mm long quartz capillary 144 through two 1 mm holes 142, 143 drilled approximately 3 mm from the ends of the capillary. Generally, the gas is a noble gas, but could comprise other gases or vapors. The short sections between the holes and the entrance of the capillary allowed a constant gas pressure to be maintained over the length of the capillary while using the chambers preceding and following the discharge for differentially pumping ($\sim 10^{-5}$ Torr). The discharge current was injected through electrodes placed at the entrance 108 and near the exit (at cathode 154) of the capillary. The discharge circuit (not shown) consisted of a storage capacitance of 9.9 nF and a series inductance of 100 µH. Current pulses were initiated using a thyratron switch. A ~10 mA DC simmer current was driven through the capillary to improve the uniformity of the plasma column and to reduce the jitter of the main current pulses. The discharge can operate at repetition rates up to 200 Hz before heat removal becomes a significant problem. Improved cooling of the discharge head would allow operation at kHz repetition rates. The entire capillary discharge 110 is very compact, measuring 10 cm in diameter and 10 cm in length, allowing it to be mounted on a stage (not shown) with translation in two directions and rotation on two axes, simplifying alignment to the injected laser pulses 107. Within a selected range of pressures and currents, the dominant heating of the plasma in the axial regions of the capillary created a concave electron density profile that results in an index waveguide (see discussion associated with FIGS. 6B and 8.

The Ti:sapphire CPA system 102 used in the experimental setup produced 22-30 fs FWHM duration pulses with energies up to 15 mJ at 10 Hz repetition rate. Laser pulses were focused onto the capillary discharge entrance 108 with a f=75 cm lens 106 to a measured diameter of ~150 µm. The HHG signal 113 exiting the waveguide was detected using a grazing incidence EUV spectrometer 116 with an x-ray CCD detector 120. Silver and zirconium foils 120 were used to reject the transmitted laser light, and silicon, boron, and aluminum filters (not shown) were used for wavelength calibration of the EUV spectra. To facilitate alignment and to measure the energy and beam quality of the transmitted laser pulses, a removable mirror 126 was placed between the discharge 113 and the spectrometer 116. Xe, Kr, and Ar, were used as gas 140 forming the plasma in capillary 144.

One experiment used 10 mJ, 28 fs laser pulses focused into the discharge initially filled with 3 Torr of Xe. A dramatic extension of the harmonic cutoff, from 95 eV to 150 eV, was observed in Xe. The cutoff was increased further, to photon energies above 160 eV, by increasing the inner diameter of capillary 144 to 250 µm versus 175 µm. In addition to extending the cutoff photon energy, the harmonic flux near the cutoff was enhanced by nearly two orders of magnitude. Also, the reduction of self-phase modulation resulted in the observation of clearly resolved harmonic peaks up to 85 eV.

Also, because the harmonic cutoff was extended due to reduced ionization-induced refraction and better guiding of the laser, the harmonic signal near cutoff was also enhanced due to increased laser intensity and ionization rates. Enhancement of the near-cutoff harmonics by an order of magnitude near 120 eV was observed. Clear harmonic peaks, up to photon energies of 110 eV, were observed (see FIG. 2A).

Figure 1B:
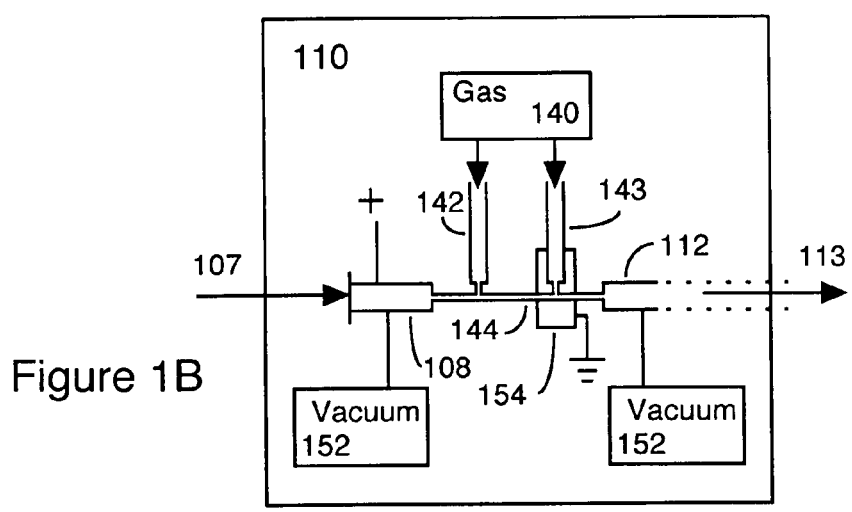
FIG. 1B is a more detailed block diagram of the capillary discharge of FIG. 1A.

FIG. 1B is a more detailed block diagram of the capillary discharge of FIG. 1A. Laser pulses 107 are focused to a diameter of about 100 μm onto capillary discharge entrance 108. Gas 140 enters two inlets, 142 and 143, and a constant pressure is maintained along the length of capillary 144 (for example 2-4 Torr of xenon gas). The length of the capillary 144 between the two inlets might be 4.5 cm, while the inlets are formed about 3 mm from the ends. Capillary inner diameters of 100 μm to 400 μm may be used in different configurations. A vacuum 152 is applied at the two capillary ends. At the capillary discharge exit 112, the vacuum is preferably maintained as the HHG pulses are used.

The anode for this capillary discharge is simply the entrance 108, while the cathode 154 is a larger separate element which is disposed around the second inlet 143 and capillary 144. The cathode heats up at relatively high repetition rates (kHz) so its structure ideally dissipates heat. It is also helpful to form the cathode of a low sputtering yield material at its surface (such as aluminum).

Capillary 144 is formed of an insulating material such as quartz, aluminum, or sapphire. If the repetition rate is high, a good heat conductor may be preferred. Inlets 142 and 143 are also insulating.

A continuous DC simmer current on the order of 10 mA is applied across the anode and cathode. Then a current pulse is applied to pre-ionize the plasma. The current pulse is synchronized to the laser, but leads it to accomplish pre-ionizing before the laser pulse arrives.

Figure 2A:
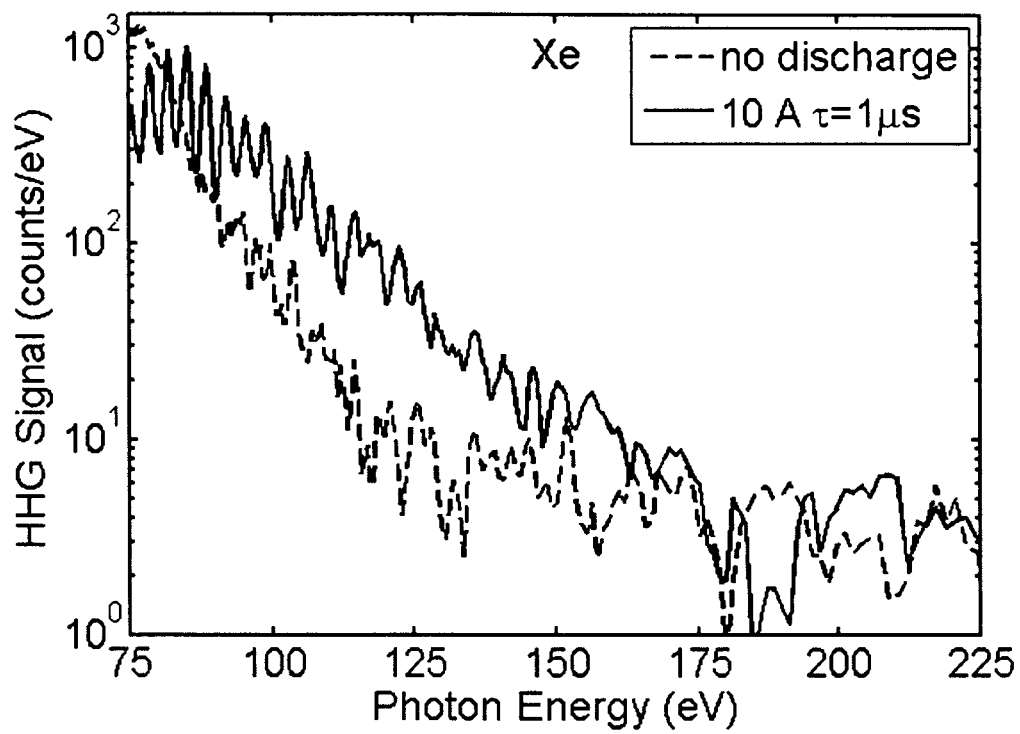
FIG. 2A is a plot illustrating extension of the harmonic cutoff in Xe according to the present invention.

FIG. 2A is a plot illustrating extension of the harmonic cutoff in Xe according to the present invention. This experiment used 10 mJ, 28 fs laser pulses focused into the discharge initially filled with 3 Torr of Xe. A higher discharge current (10 A) was employed in comparison with earlier experiments because of the larger inner diameter of the capillary –250 μm, rather than 170 μm.

Figure 2B:
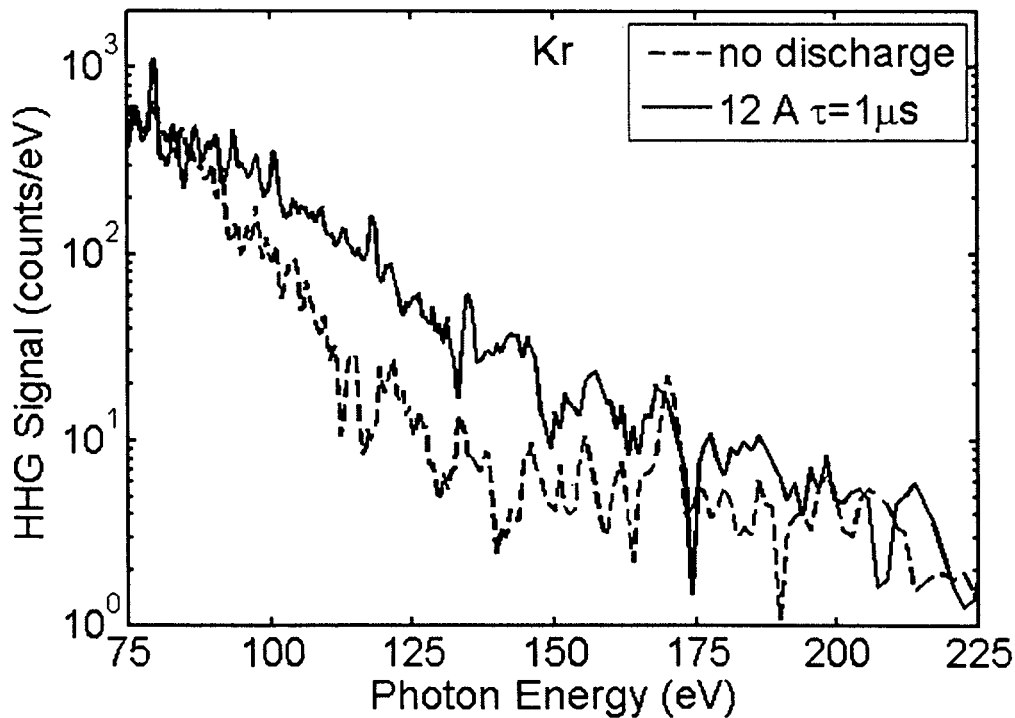
FIG. 2B is a plot illustrating extension of the harmonic cutoff in Kr.
Figure 2C:
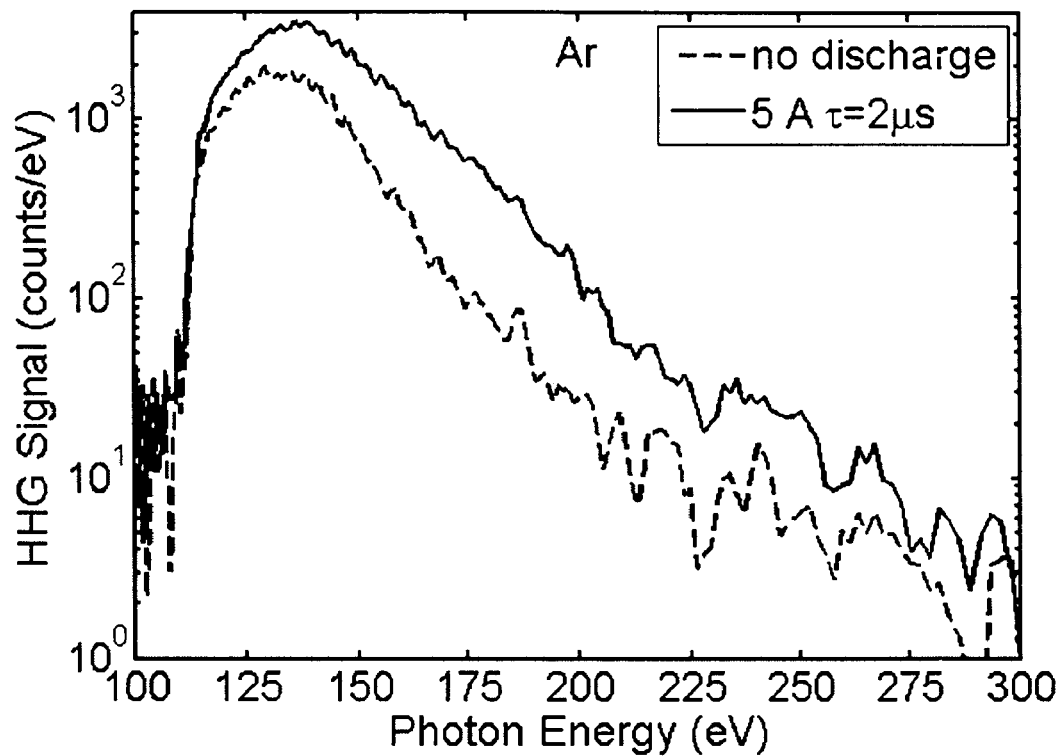
FIG. 2C is a plot illustrating extension of the harmonic cutoff in Ar.

FIG. 2B is a plot illustrating extension of the harmonic cutoff in Kr. FIG. 2C is a plot illustrating extension of the harmonic cutoff in Ar. Using a capillary waveguide without the discharge running, the HHG signal extends to 125 eV for Kr and 225 eV for Ar. When the discharge was used, the observed maximum photon energies were extended further, to 170 eV and 275 eV, respectively. Prior to these experiments, the highest photon energies generated from these two gases using an 800 nm driving laser were 70 eV and 250 eV, respectively. Thus, the cutoff in Kr was extended by 100 eV while the cutoff in Ar was extended by 25 eV, compared with all past measurements. The discharge pulses used for these experiments had amplitudes of 12 A and 5 A for Kr and Ar, respectively. As well as extending the cutoff photon energy, the presence of the discharge also enhances the harmonic flux in Kr and Ar at high photon energies.

In the case of Ar, the characteristics of the plasma column were optimized for maximum HHG cutoff by adjusting the gas pressure, the delay of the laser pulse with respect to the rising edge of the discharge current pulse, the driving laser intensity and the amplitude of the discharge current pulse. All of the HHG spectra from Ar were measured using two 200 nm thick silver filters, which only transmit photons with energy above ~110 eV. Silicon and boron filters, which have sharp absorption edges at 99.9 eV and 188.4 eV, respectively, were used for calibration of the spectrometer.

Figure 3:
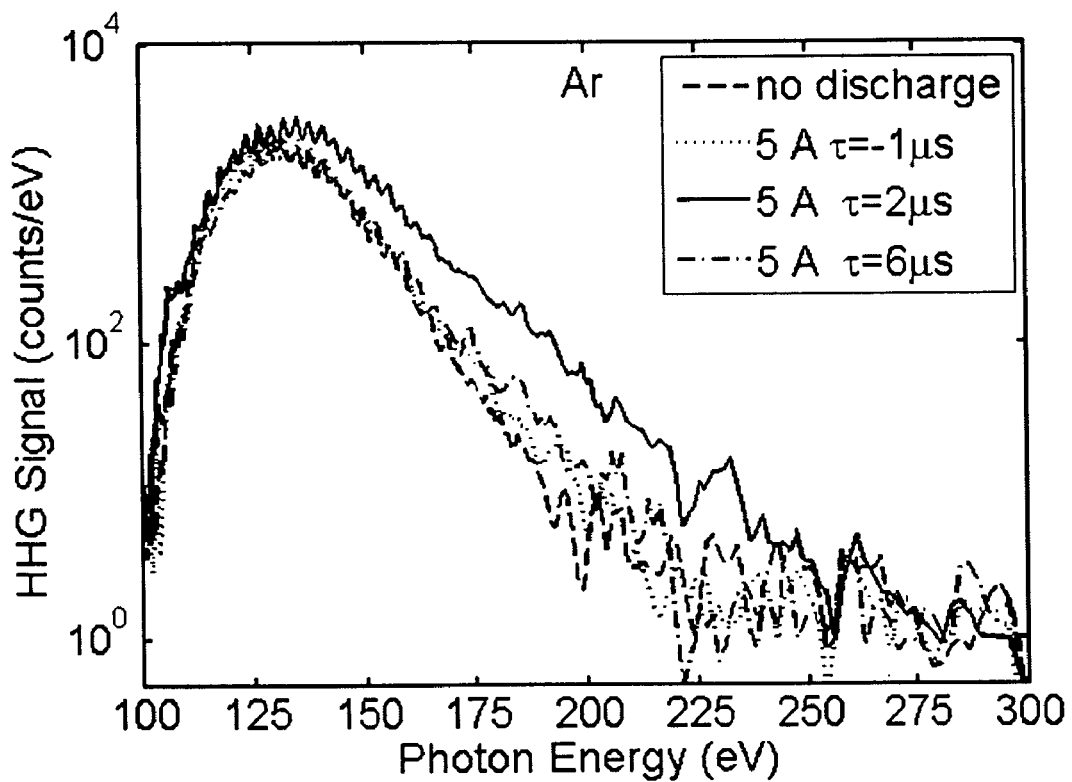
FIG. 3 is a plot illustrating the HHG signal in Ar for various delay times, τ, between the onset of the discharge current pulse and the driving laser.

FIG. 3 is a plot illustrating the HHG signal in Ar for various delay times, τ, between the onset of the discharge current pulse and the driving laser. Even before the discharge pulse is initiated, there is a small enhancement of the HHG flux and cutoff photon energy when compared with the spectrum taken in the capillary waveguide without the discharge on. This is due to reduced photoionization-induced refraction of the driving laser associated with the small DC simmer current. At the optimum delay of τ=2 μs, the HHG spectrum near cutoff is enhanced and extends to even shorter wavelengths of 275 eV.

Figure 4:
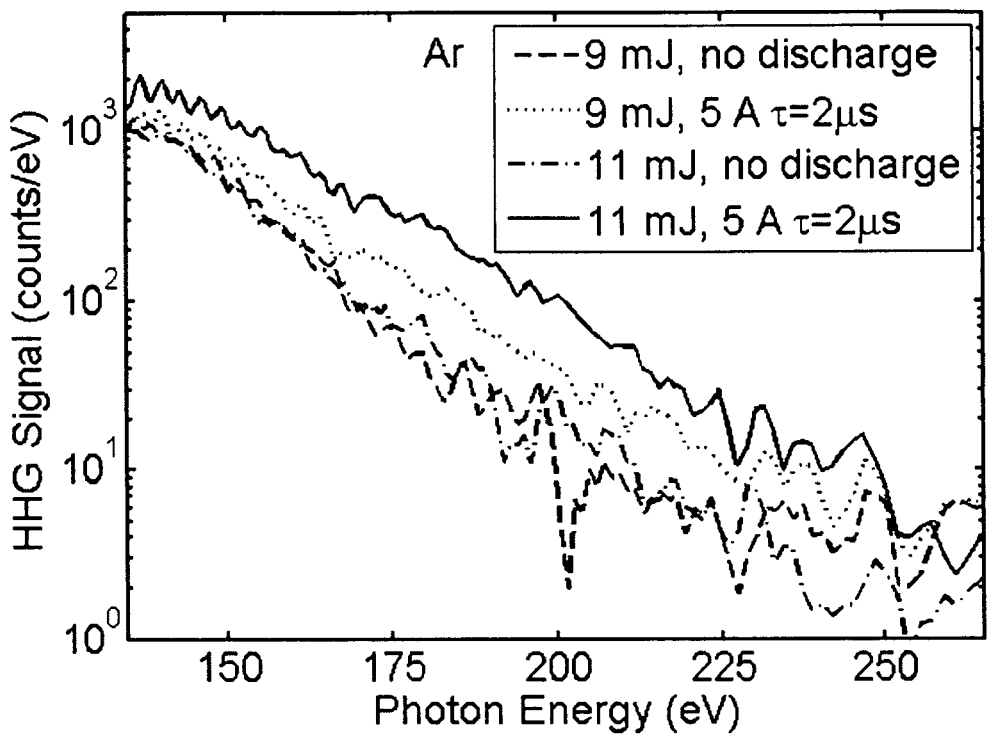
FIG. 4 is a plot illustrating the reduction of ionization-induced refraction in Ar.

FIG. 4 is a plot illustrating the reduction of ionization-induced refraction in Ar. by creating a preformed, ionized medium, the discharge reduces ionization-induced refraction losses of the laser, making it possible to maintain a high laser intensity over a long interaction length. The higher laser intensity extends the harmonic cutoff and increases the ionization rate, leading to the generation of brighter harmonics as observed experimentally. The reduced refraction of the laser is shown in FIG. 4, where the pulse energy is varied in the capillary, with and without the discharge running. In these data, a peak laser intensity of $2-3\times10^{15}$ W/cm$^2$ was used to generate photon energies >200 eV in Ar. Without the discharge running, the HHG spectrum does not change significantly as the laser pulse energy is increased from 9 mJ to 11 mJ, indicating that the peak intensity is clamped by photoionization-induced defocusing. However, when the discharge is present, there is a large enhancement in HHG flux because of the higher laser intensity and increased photoionization as the driving pulse energy is increased.

Figure 5:
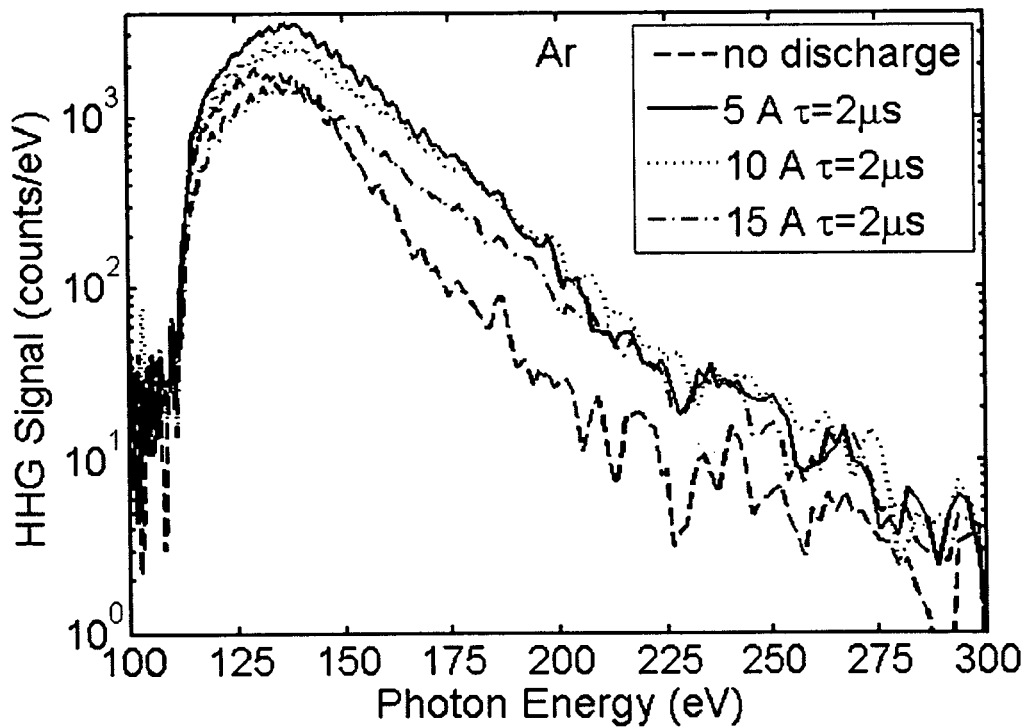
FIG. 5 is a plot illustrating harmonic emission in Ar in photon energy ranges over 100 eV.

FIG. 5 is a plot illustrating harmonic emission in Ar in photon energy ranges over 100 eV. Here, the higher level of ionization of the discharge-created plasma reduces the density of neutral atoms that have higher nonlinear susceptibility. Increasing ionization also decreases the coherence length between the driving laser and the harmonics, thereby reducing the harmonic flux when the discharge is running. This is in contrast to higher photon energies (>200 eV), which are enhanced in the presence of the discharge. These effects can be seen in FIG. 5, as the discharge current is varied from 5 to 15 A. Comparing the spectra obtained with and without the discharge, the presence of the discharge reduces ionization-induced refraction, even at the minimum current of 5 A. However, as the current is further increased, the HHG flux at ~100 eV is reduced due to the lower ionization rate and the shorter coherence length associated with a higher overall level of ionization. A similar drop in the HHG flux in the low energy range is observed in the case of harmonic emission from Kr and Xe in the discharge (FIG. 2), although higher currents are needed to obtain a similar degree of ionization in Ar (>15 A) compared with Xe (10 A). Again, the flux at high photon energies is not decreased, where ADK calculations show that these harmonics are only generated at times during the laser pulse when the plasma is completely ionized. These harmonics have similar coherence lengths regardless of whether the plasma is completely ionized by the laser or by the discharge. Finally, measurements of the laser energy transmitted through the discharge indicate that the cutoff photon energy should extend to >400 eV for the estimated laser intensity of $2.3\times10^{15}$ W/cm$^2$ used in these experiments. These data thus indicate that any further extension of the cutoff in Ar is primarily limited by the large plasma-induced phase mismatch between the fundamental and harmonic waves. The capillary discharge plasma medium for high harmonic generation described here will produce an extended cutoff and increased high harmonic output when combined with a quasi-phase matching technique.

Figure 6A:
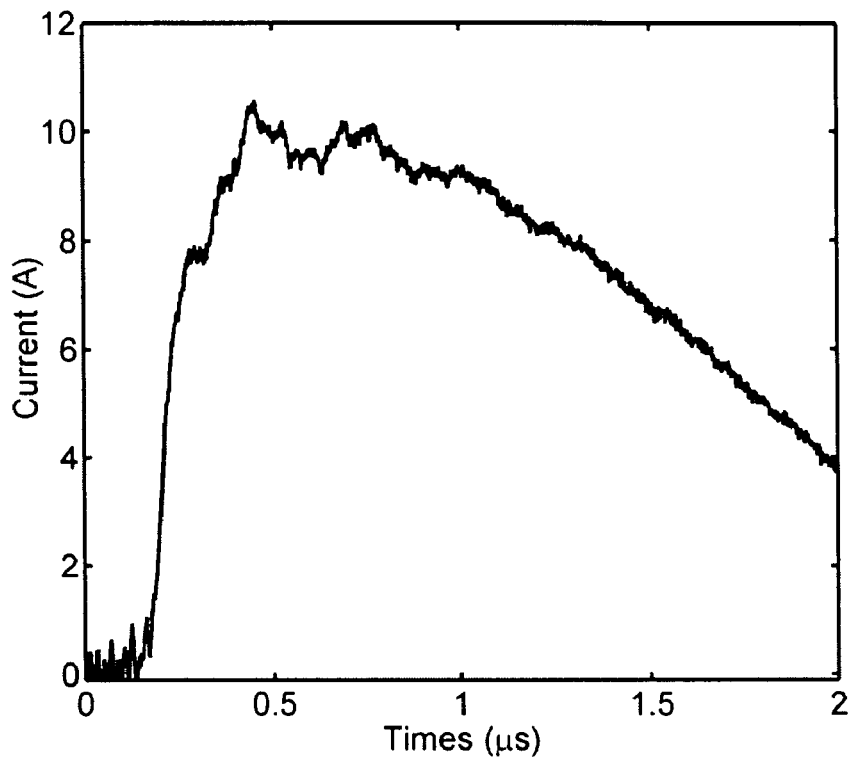
FIG. 6A is a plot illustrating the temporal profile of the current pulse used to obtain the results in FIG. 2A.

FIG. 6A is a plot illustrating the temporal profile of the current pulse used to obtain the results in FIG. 2A. FIG. 6 shows the computed spatio-temporal evolution of the plasma parameters for a 10 A peak current pulse in xenon. The measured temporal profile of the current pulse used to obtain the results in FIG. 2A was used for this simulation, and is shown in FIG. 6A.

Figure 6B:
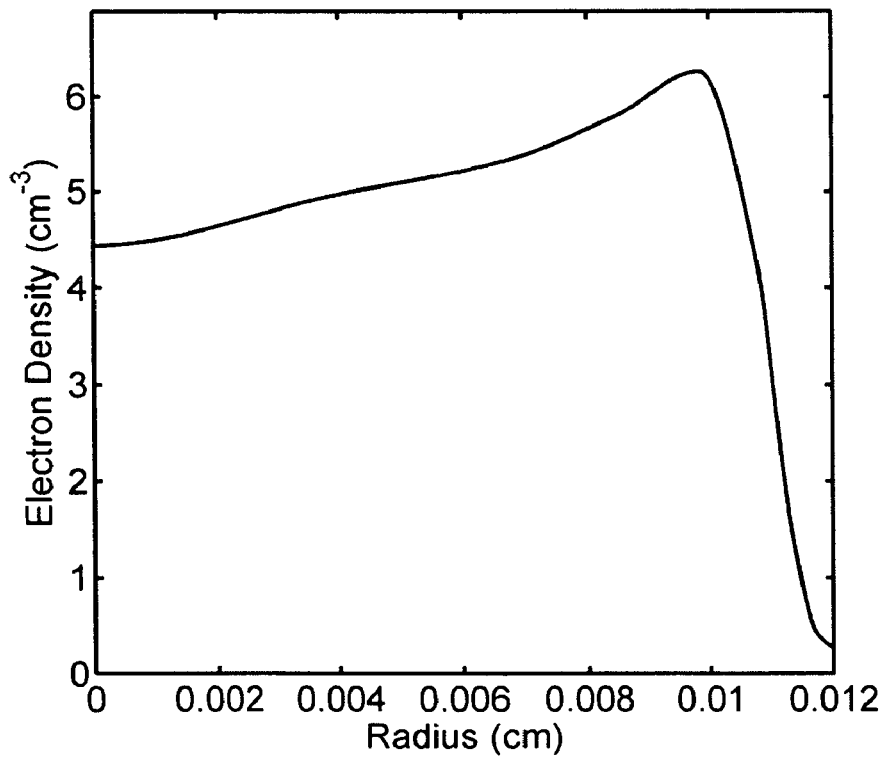
FIG. 6B is a plot illustrating the concave radial profile of the electron density at τ=2 µs, under the conditions at which the profile of FIG. 2A was obtained.

FIG. 6B is a plot illustrating the concave radial profile of the electron density in Xe at $\tau=2$ µs, under the conditions at which the profile of FIG. 2A was obtained. The measured temporal profile of the current pulse used to obtain the results in FIG. 2a was used for this simulation, and is shown in FIG. 6a. The plasma in the central region of the capillary is rapidly ionized to a mean ion charge Zm of ~1 and remains predominately singly ionized for several microseconds. At the delay for which the harmonic spectrum of FIG. 2 was obtained ($\tau=1.5$ µs) the plasma is essentially completely singly ionized.

During the current pulse the plasma is hottest in the center with the temperature decreasing radially, since maximum Ohmic heating occurs on axis and the walls of the capillary act as a heat sink. As initial pressure shockwaves are dampened and pressure equilibrium is established, this temperature profile leads to an electron density profile for the Xe plasma that is minimum on axis and increases radially.

FIG. 6B shows the concave radial profile of the electron density at a delay of $\tau=2$ µs. This simulation predicts that under the conditions at which the spectrum of FIG. 2a was obtained, the discharge prepares a nonlinear medium that consists nearly entirely of singly ionized Xe. Additionally, the concave electron density profile of the plasma assists in guiding the beam and mitigates ionization induced defocusing.

Figure 6C:
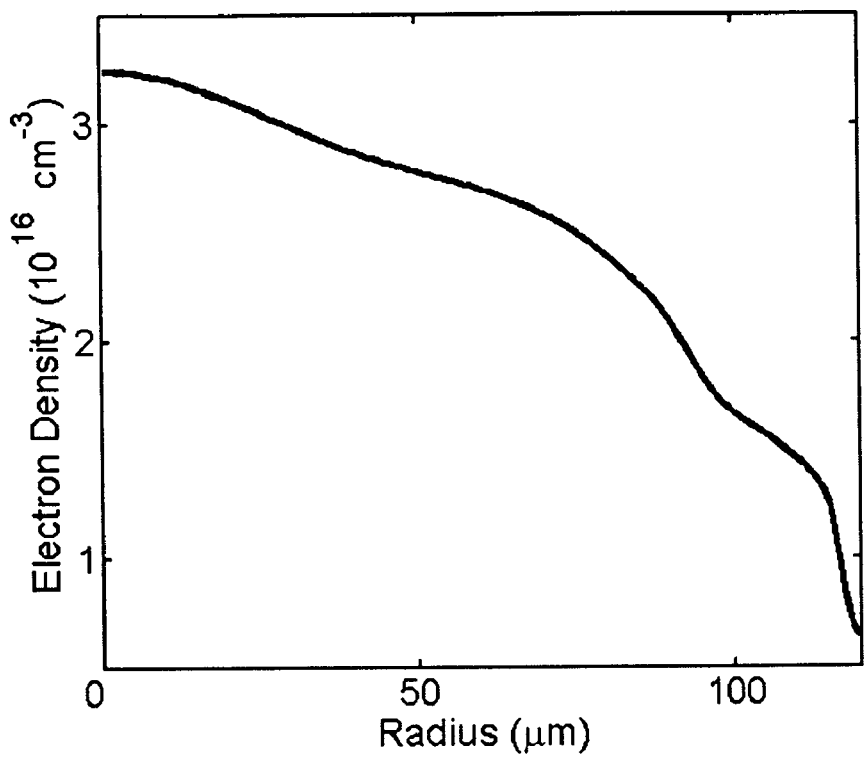
FIG. 6C is a plot illustrating the non-concave radial profile of the electron density for 6 Torr Ar, at τ=2 µs, under the conditions at which the profile of FIG. 2A was obtained

FIG. 6C is a plot illustrating the non-concave radial profile of the electron density for 6 Torr Ar, at $\tau=2$ µs, under the conditions at which the profile of FIG. 2A was obtained. Although the plasma achieves a similar electron temperature as the Xe case, the Ar plasma is not completely ionized. This is due to the significantly higher ionization potential of neutral Ar of 15.8 eV, compared with 12.1 eV for neutral Xe, and also the larger ion diffusion loss to the walls in Ar. Because not all of the neutral atoms are ionized at this current, the radial temperature difference leads to a radial variation in ionization. The increased ionization in the hot center of the discharge plasma flattens the electron density profile.

Figure 7A:
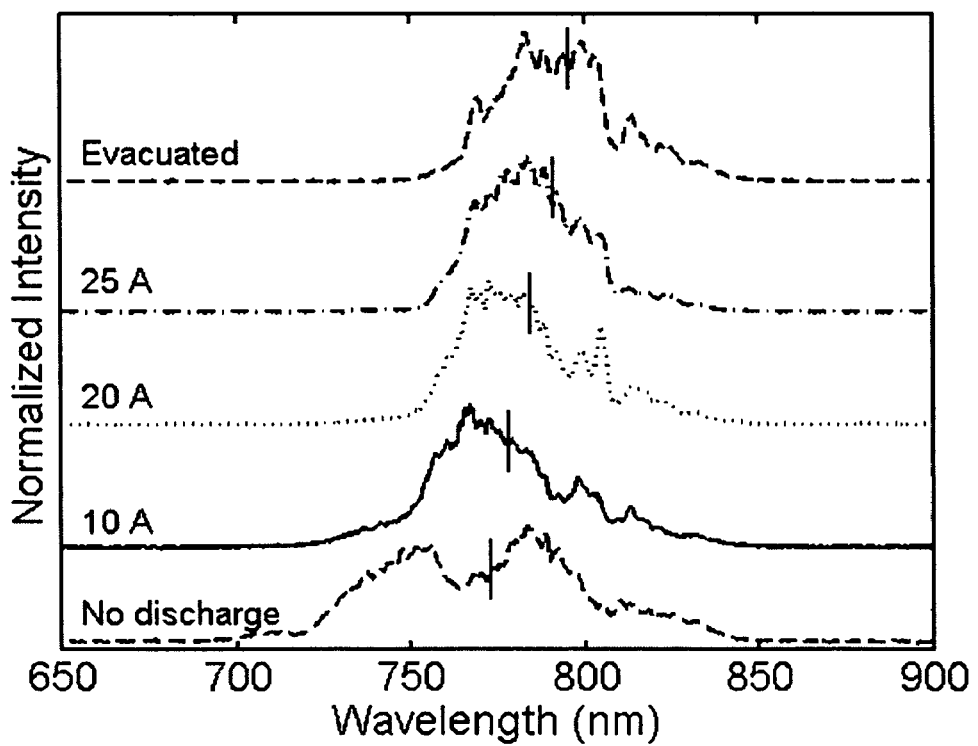
FIG. 7A is a plot illustrating the blue shift and spectral distortion in the driving laser spectra at various discharge currents in Ar, due to pre-ionization of the medium.
Figure 7B:
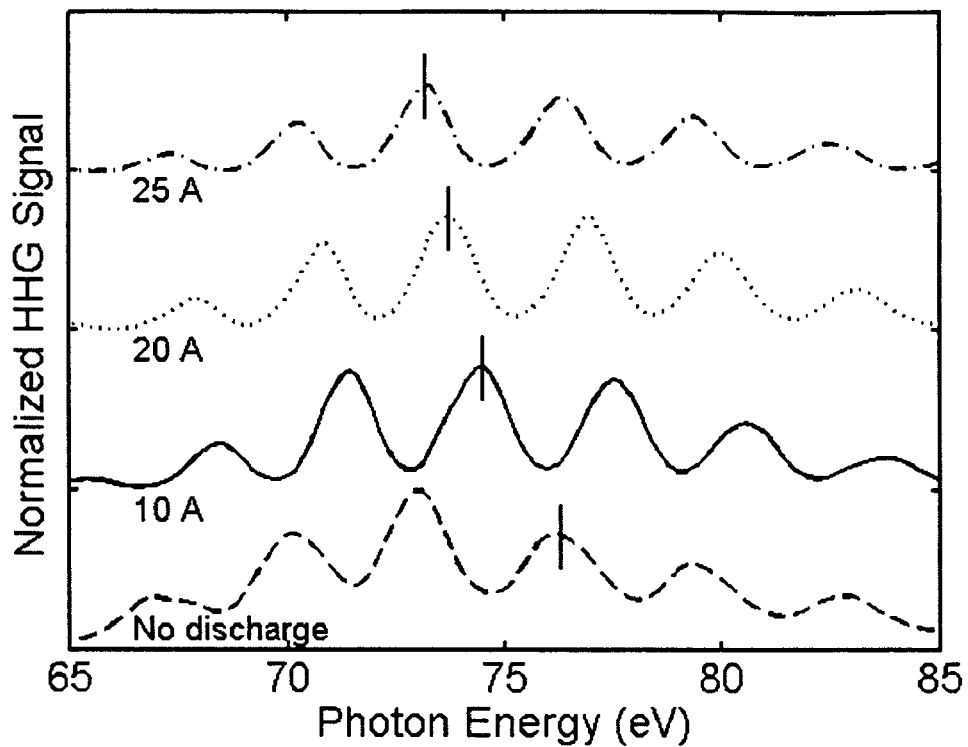
FIG. 7B is a plot illustrating the blue shift of the emitted harmonics.

FIG. 7A is a plot illustrating the blue shift in the fundamental spectra at various discharge currents in Ar, due to pre-ionization of the medium. FIG. 7B is a plot illustrating the blue shift of the emitted harmonics.

The fundamental spectra in FIG. 7A exhibits a blueshift that is reduced with higher discharge currents. This blueshift is caused by the rapid change of the index of refraction that accompanies fast ionization of the gas on the leading edge of the laser pulse. This ionization-induced blueshift is extremely large (~20 nm) for a hollow capillary filled with 5.2 Torr Ar, but is reduced to 6-15 nm when the discharge pre-ionizes the gas. This reduced blueshift in the presence of the discharge is because without the discharge, neutral Ar is doubly ionized on the leading edge of the intense laser pulse. However, when the discharge is used to pre-ionize the medium, the laser only ionizes Ar+ to Ar2+. This leads to a smaller index change during the rising edge of the laser pulse and, consequently, to reduced blueshifting of the emitted harmonics shown if FIG. 7B. Thus, this effect can be distinguished from the blueshift induced by the intrinsic phase accumulated by the electron as it propagates in the laser field. FIG. 7b shows the harmonic spectrum in the range of the 47th harmonic for several discharge currents.

The 47th harmonic with no discharge current present is blueshifted by 3.2 eV, which shifts this harmonic to approximately the wavelength corresponding to the 49th harmonic in the presence of a discharge current of 25 A. In contrast, the shift in the 47th harmonic at this discharge current is only 1.1 eV. The observed blueshift for currents between 0-25 A is between these two values. A practical consequence of this effect is that it is possible to tune the harmonic wavelength by changing the discharge current to tailor the amount of blueshift.

Figure 8:
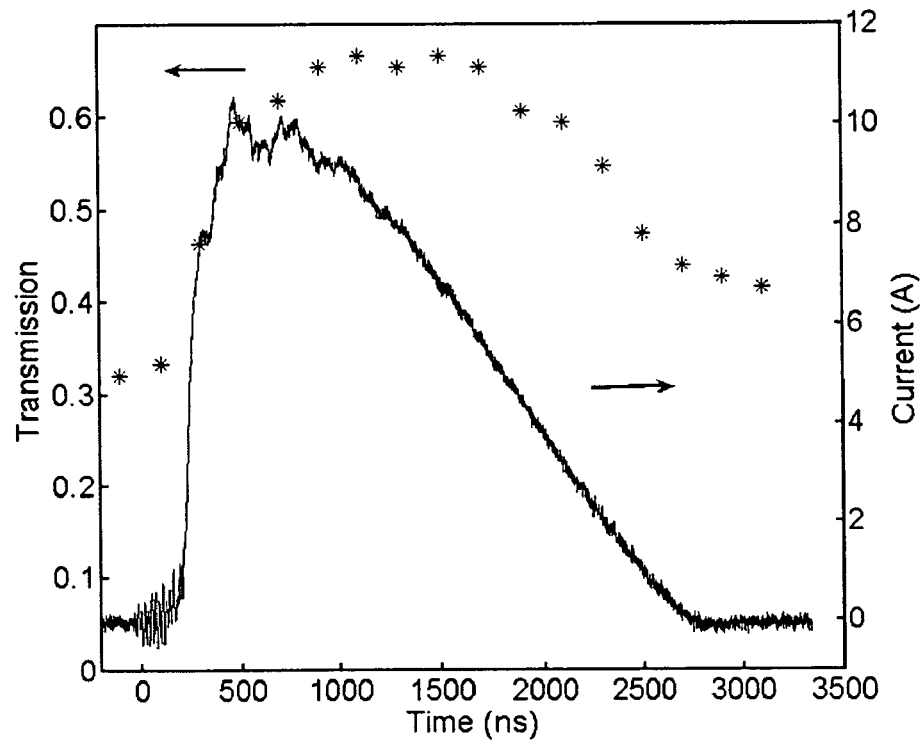
FIG. 8 is a plot illustrating improved transmission of pulses in Ar with pre-ionization, due in part to an induced density profile that constitutes an index waveguide.

FIG. 8 is a plot illustrating improved transmission of pulses in Ar with pre-ionization, due in part to an induced density profile that constitutes an index waveguide. The capillary discharge not only reduces ionization-induced defocusing and self-phase modulation of the driving laser by creating a preformed, ionized medium, but, under certain conditions, it also creates a density profile that constitutes an index waveguide. FIG. 8 shows the measured transmission of ~28 fs FWHM, 8.5 mJ pulses through the waveguide initially filled with 6 Torr of Ar for different time delays between the rise of the current pulse and the injection of the laser pulse. The discharge was operated with conditions nearly identical to those that optimize HHG in Ar. Without the discharge the transmission is ~24%, while the DC simmer current improves the transmission to 32%. When the current pulse is initiated, the transmission quickly rises to a peak pulse energy transmission of 65%. This is an improvement of the transmission efficiency of nearly a factor of 3. This high transmission remains relatively constant for approximately 1 µs and is high at the time delay where the best harmonic emission was observed. In addition to this improvement of the overall transmission, the quality of the laser mode exiting the capillary is also significantly improved.

It will be appreciated by one versed in the art that there are many possible variations on these designs that come within the scope of the present invention. For example, many of the same advantages of pre-ionization of the harmonic generation medium also apply to the case where the plasma waveguide is generated using other means, such as a laser pulse separate from the one used for harmonic generation itself. The use of such a waveguide for high harmonic generation has been discussed previously; however, it has not previously been implemented, and prior discussions do not outline advantages of such a geometry for HHG other than the extended interaction length afforded by a waveguide geometry (i.e. reduced pulse distortion, etc). Furthermore, either type of plasma geometry can be used in conjunction with methods for phase matching or quasi phase matching the harmonic generation process.

The invention claimed is:

1. Apparatus for generation of coherent light by high-order harmonic generation (HHG) comprising:

laser apparatus for providing coherent periodic optical pulses;

electric discharge apparatus for generating pre-ionized plasma including;

a capillary discharge tube formed of an insulating material;

apparatus for supplying a gas at a desired pressure into the discharge tube; and circuitry to provide a periodically pulsed electric discharge across the gas for ionizing the atoms of the gas, wherein the periodically pulsed discharge leads the optical pulses by an interval, t; the circuitry including an anode electrode and a cathode electrode, the electrodes located at spaced apart openings on the capillary discharge tube; and optics for directing the optical pulses into the ionized gas; wherein the electric discharge apparatus pre-ionizes the gas sufficiently to allow the optical pulses to cause HHG in the pre-ionized gas, while reducing ionization-induced defocusing of the optical pulses.

2. The apparatus of claim 1, wherein the circuitry provides a direct current discharge to facilitate the pulsed discharge.

3. The apparatus of claim 1 wherein the gas is a noble gas.

4. The apparatus of claim 3 wherein the gas is selected from among the group: Ar, Xe, Kr.

5. The apparatus of claim 1 where at least one of the following parameters is adjusted to optimize an aspect of the HHG pulses:
Pulsed discharge current;
Delay time t;
Composition of the gas;
Pressure of the gas;
Current of direct current discharge.

6. The apparatus of claim 5 wherein the predetermined pressure is sufficiently high that without pre-ionization, the pulses would be defocused and distorted via phase modulation, but with pre-ionization the defocusing and distortion is substantially reduced.

7. The apparatus of claim 5 wherein the discharge current is selected to result in an index of refraction profile in the plasma which guides the laser pulses.

8. The apparatus of claim 5 wherein the discharge current is selected to result in a desired tuning of the harmonic wavelength of the HHG pulses.

9. The apparatus of claim 1 wherein the discharge current is selected to achieve a charge state of the most abundant ions that is optimum for HHG.

10. The apparatus of claim 1 wherein the discharge current is on the order of 5-100 A.

11. The apparatus of claim 1 wherein t is on the order of 1-10 ms.

12. The apparatus of claim 1 wherein the apparatus for providing coherent periodic optical pulses is a femtosecond laser.

13. The method of generating coherent light pulses by high-order harmonic generation (HHG) comprising the steps of:
providing coherent periodic optical pulses;
generating pre-ionized plasma by supplying a gas at a predetermined pressure to a capillary discharge tube formed of an insulating material;
providing a periodically pulsed electric discharge across the gas for ionizing the atoms of the gas sufficiently to allow the optical pulses to cause HHG in the pre-ionized gas, while reducing ionization-induced defocusing of the optical pulses, wherein the periodic discharge leads the optical pulses by an interval, t; and
directing the optical pulses into the pre-ionized gas, wherein the optical pulses cause HHG in the pre-ionized gas.

14. The method of claim 13, further including the step of optimizing an aspect of the HHG pulses by adjusting at least one of the following:
Pulsed discharge current;
Delay time t;
Composition of the gas;
Pressure of the gas;
Direct discharge current.

15. Apparatus for generation of coherent light pulses by high-order harmonic generation (HHG) comprising:
means for providing coherent periodic optical pulses;
a capillary discharge for generating pre-ionized plasma including;
means for supplying a noble gas at a consistent pressure to a length of capillary; and
means for providing a periodically pulsed electric discharge across the capillary for ionizing the atoms of the gas including an anode electrode and a cathode electrode, the electrodes located at spaced apart openings on the capillary discharge tube, wherein the periodic discharge leads the optical pulses by an interval, t; and
means for directing the optical pulses into the capillary;
wherein the capillary discharge pre-ionizes the gas sufficiently to allow the optical pulses to cause HHG in the pre-ionized gas, while reducing ionization-induced defocusing of the optical pulses.

16. The apparatus of claim 15, wherein the gas pressure and the discharge current are selected to result in an index of refraction gradient across the capillary which guides the laser pulses through the capillary.

* * * * *